(12) United States Patent
Burrell et al.

(10) Patent No.: US 12,044,287 B2
(45) Date of Patent: Jul. 23, 2024

(54) TEMPERATURE-DRIVEN VALVE ASSEMBLY

(71) Applicant: STABILUS GMBH, Koblenz (DE)

(72) Inventors: Joshua Burrell, Nörtershausen (DE); Castor Fuhrmann, Brachtendorf (DE); Karl-Josef Seibert, Alken (DE); Arnold Schilz, Lahnstein (DE)

(73) Assignee: STABILUS GMBH, Koblenz (DE)

( * ) Notice: Subject to any disclaimer, the term of this patent is extended or adjusted under 35 U.S.C. 154(b) by 311 days.

(21) Appl. No.: 17/624,397

(22) PCT Filed: Jun. 17, 2020

(86) PCT No.: PCT/EP2020/066746
§ 371 (c)(1),
(2) Date: Jan. 3, 2022

(87) PCT Pub. No.: WO2021/004739
PCT Pub. Date: Jan. 14, 2021

(65) Prior Publication Data
US 2022/0349453 A1    Nov. 3, 2022

(30) Foreign Application Priority Data
Jul. 5, 2019    (DE) ..................... 10 2019 118 211.5

(51) Int. Cl.
*F16F 9/52*    (2006.01)
*F16F 9/02*    (2006.01)
*F16F 9/36*    (2006.01)

(52) U.S. Cl.
CPC ............ *F16F 9/523* (2013.01); *F16F 9/0218* (2013.01); *F16F 9/369* (2013.01)

(58) Field of Classification Search
CPC .. F16F 9/523; F16F 9/34; F16F 9/0218; F16F 9/369; F16K 31/002
See application file for complete search history.

(56) References Cited

U.S. PATENT DOCUMENTS

| 3,804,326 | A |   | 4/1974 | McIntire |
|---|---|---|---|---|
| 4,025,042 | A | * | 5/1977 | Doherty, Jr. ........... F16K 31/002 236/87 |
| 4,068,800 | A | * | 1/1978 | Doherty, Jr. ........... G05D 23/08 236/87 |
| 4,156,518 | A | * | 5/1979 | Ludwig ................. F16K 31/025 236/101 E |

(Continued)

FOREIGN PATENT DOCUMENTS

| DE | 11 2006 000 335 T5 | 3/2008 |
|---|---|---|
| DE | 102016100344 A1 | 7/2016 |

(Continued)

OTHER PUBLICATIONS

International Search Report for PCT/EP2020/066746 issued on Sep. 21, 2020.

*Primary Examiner* — Thomas W Irvin
(74) *Attorney, Agent, or Firm* — Schmeiser, Olsen & Watts, LLP

(57) ABSTRACT

Provided is a temperature-driven valve assembly which can be manufactured in a cost-effective and simple manner as well as a gas pressure spring including the valve assembly which enables more reliable and safer operation of the gas pressure spring.

9 Claims, 8 Drawing Sheets

(56) References Cited

U.S. PATENT DOCUMENTS

| | | | | |
|---|---|---|---|---|
| 4,408,751 A * | 10/1983 | Dodson | ............... | F16F 9/52 |
| | | | | 267/64.11 |
| 4,830,277 A * | 5/1989 | Hood | ............... | G05D 23/10 |
| | | | | 236/93 R |
| 6,959,921 B2 * | 11/2005 | Rose | ............... | F16F 9/0263 |
| | | | | 188/300 |
| 7,484,720 B2 * | 2/2009 | Lange | ............... | F16F 9/523 |
| | | | | 188/300 |
| 9,416,570 B1 * | 8/2016 | Colombo | ............ | F16F 13/002 |
| 9,593,737 B2 * | 3/2017 | Colombo | ............ | F16F 9/0281 |
| 9,683,623 B2 * | 6/2017 | Colombo | ............ | E05F 1/1091 |
| 11,015,326 B2 * | 5/2021 | Renaud | ............ | E03C 1/0404 |
| 11,901,144 B2 * | 2/2024 | Hofsaess | ............ | H01H 37/04 |
| 2006/0175164 A1 * | 8/2006 | Lange | ............ | F16F 9/0227 |
| | | | | 188/277 |
| 2016/0201754 A1 * | 7/2016 | Colombo | ............ | F16F 9/526 |
| | | | | 188/277 |

FOREIGN PATENT DOCUMENTS

| | | |
|---|---|---|
| JP | 52-140027 A | 11/1977 |
| JP | 2010-203616 A | 9/2010 |
| KR | 101538020 B1 | 7/2015 |
| WO | 2015135706 A1 | 9/2015 |

* cited by examiner

- State of the art -

- State of the art -

- State of the art -

TEMPERATURE-DRIVEN VALVE ASSEMBLY

CROSS-REFERENCE TO RELATED APPLICATIONS

This application claims priority to PCT Application No. PCT/EP2020/066746, having a filing date of Jun. 17, 2020, based on German Application No. 10 2019 118 211.5, having a filing date of Jul. 5, 2019, the entire contents both of which are hereby incorporated by reference.

FIELD OF TECHNOLOGY

The following relates to a temperature-driven valve assembly comprising a channel portion for the fluid-conducting connection of two chambers for accommodating a fluid having a through opening for the fluid, at least one switching element having an opening configuration in an opening temperature range and a closing configuration in a closing temperature range, the switching element being, at least in sections, movable relative to the channel portion along an axis of movement in a temperature-driven manner, an opening normal of the through opening being oriented towards the switching element, and the channel portion being circumferentially enclosed by a channel wall around the axis of movement, and at least one sealing means circumferentially extending around the channel wall, the sealing means abutting on at least one sealing surface of the channel wall in a mounting position, a surface normal of the sealing surface being oriented towards the switching element, the at least one sealing means, in the mounting position, cooperating, in a sealing manner, with the at least one sealing surface and the at least one switching element in the closing configuration and closing the through opening, and the at least one sealing means, in the mounting position, being spaced apart from the at least one switching element in the opening configuration along the axis of movement so that a primary fluid path connects the two chambers through the through opening and between the at least one switching element and the at least one sealing means in a fluid-conducting manner.

The following further relates to a gas pressure spring comprising at least two separated chambers for accommodating a fluid.

BACKGROUND

In the conventional art, gas pressure springs are, for example, used to fully or partly provide for weight compensation for engine covers, tailgates and rear doors of passenger cars, station wagons and vans to allow for them to be opened with ease and to keep them in a fully or partly opened position. It is further known that the force delivery of gas pressure springs is clearly temperature-dependent. A force generated by the gas pressure spring at low temperatures can be much smaller than a force generated at high temperatures.

Hence, the gas pressure spring has to be designed so that it generates a sufficiently large force to be capable of keeping the engine cover, tailgate, rear door or the like (in the following: "load") open even at very low temperatures (e.g., down to −30° C.). At the same time, this requirement on the gas pressure spring results in that, at high temperatures (e.g., 20-50° C.), a correspondingly larger force is provided by the gas pressure spring. Consequently, it will become harder for the user or a motorised drive to close the load again against the force of the gas pressure spring.

Also, the high variability of the force with temperature as such poses a problem to the user since he/she may, for example, become accustomed to the large force to be applied by him/her at high temperatures (e.g., in the summer months) and will then, at a considerably lower temperature, apply excessive force to close the load whereby the load might, under certain circumstances, be damaged.

Due to the proportional effect according to which a reduced temperature lowers the gas pressure in a known volume, gas pressure springs offer a reduced lifting force or extension force at low temperatures. In order to circumvent this problem it is, for example, known from patent application DE11 2006 000 335 T5 to install a temperature-balancing valve in the gas pressure spring body which, depending on the temperature, will or will not enable a fluid connection between a main chamber and a secondary chamber of the gas pressure spring. When the valve is closed, for example at temperatures above 4° C., the gas pressure spring will operate using only the main chamber. The gas pressure spring will then offer a force delivery which is based on the gas mass and the gas volume contained in the main chamber.

At low temperatures, for example below 4° C., the valve will open, whereby the gas pressure spring will operate with both chambers and provide a force delivery which is based on the entire gas mass and the entire gas volume of both chambers. The additional secondary chamber causes an increased force delivery.

As a result, in the ideal case, the temperature dependency of the gas pressure spring force can be reduced in this way to provide a sufficiently large force at low temperatures and to provide a force which is not too large at high temperatures.

The temperature-balancing valve assembly of the DE11 2006 000 335 T5 uses a valve element of a bimetal spring cooperating with an O-ring arranged around a valve passage portion to form a seal in a closed position of the temperature-balancing valve assembly and to close a fluid path through the valve passage portion connecting the chambers. At a low temperature, the bimetal spring springs into an open position, and both chambers together provide for the effective volume of the gas pressure spring.

However, it turned out that, for this solution, in practice, an optimisation for further improving the reliability of the gas pressure spring was desirable.

SUMMARY

An aspect relates to a temperature-driven valve assembly which can be manufactured in a cost-effective and simple manner as well as a gas pressure spring including such valve assembly which enables a more reliable and safer operation of a gas pressure spring.

The temperature-driven valve assembly according to embodiments of the invention comprises a channel portion for the fluid-conducting connection of two chambers for accommodating a fluid having a through opening for the fluid, and at least one switching element having an opening configuration in an opening temperature range and a closing configuration in a closing temperature range. The switching element is, at least in sections, movable relative to the channel portion along an axis of movement in a temperature-driven way, an opening normal of the through opening is oriented towards the switching element, and the channel portion is circumferentially enclosed by a channel wall around the axis of movement. The channel portion is, for example, substantially cylindrical and/or coaxial to the axis of movement.

Within the meaning of embodiments of the invention, the term "along" refers to a substantially parallel orientation including, for example, an angle of 0° to 10°, particularly of 0° to 5°, preferably of 0° to 1°. The opening normal of the through opening may, in particular, be oriented along the axis of movement.

The valve assembly comprises at least one sealing means circumferentially extending around the channel wall, the sealing means, in a mounting position, abutting on at least one sealing surface of the channel wall. A surface normal of the sealing surface is oriented towards the switching element, and the at least one sealing means, in the mounting position, cooperates, in a sealing manner, with the at least one sealing surface and the at least one switching element in the closing configuration and closes the through opening. The at least one sealing means is, in the mounting position, spaced apart from the at least one switching element in the opening configuration along the axis of movement so that a primary fluid path connects the two chambers through the through opening and between the at least one switching element and the at least one sealing means in a fluid-conducting manner.

The sealing means may, for example, comprise an O-ring. The switching element may, for example, comprise a bimetal spring, wherein, particularly, the O-ring and the bimetal spring, in the closing configuration, may form a seal. The valve assembly including the O-ring and the bimetal spring may, for example, be configured like the TCV arrangement described in DE 11 2006 000 335 T5 in paragraphs [0030] to [0041] including an O-ring and a bimetal spring which brings about the advantages described there. The mentioned paragraphs [0030] to [0041] of the patent application DE 11 2006 000 335 T5 are incorporated herein by reference.

The sealing means may, in particular, a form seal circumferentially extending around the through opening, for example, coaxial to the axis of movement, together with the switching element in the closing configuration.

The valve assembly comprises at least one recess in the channel wall. A projection of the at least one recess along the axis of movement is, in particular, fully enclosed by a projection of the sealing surface along the axis of movement. This means that the recess does not axially project to the outside beyond the sealing surface from the axis of movement. In an embodiment, the entire recess is at least as close to the axis of movement as the point of the sealing surface closest to the axis of movement. In particular, the recess forms no bypass connecting the chambers in a fluid-conducting manner through the sealing surface or around the seal formed by the sealing surface and the switching element in the closing configuration. The valve assembly is therefore reliably closed in the closing configuration, irrespective of the recess.

In an embodiment, the recess is, with respect to the axis of movement, radially fully within the sealing means in the mounting position. In this way, it can be ensured that the secondary fluid path does not cause any undesired leakage in the closing configuration since the secondary fluid path can only be unblocked by a movement of the sealing means out of the mounting position.

In an operating position of the sealing means in which the sealing means is spaced apart from the at least one sealing surface along the axis of movement, a secondary fluid path connects the two chambers to each other in a fluid-conducting manner through the at least one recess. When the sealing means has moved so far away from the sealing surface in the operating position that it abuts on the switching element in the opening configuration the primary fluid path can be closed in this way. Then, even in the opening configuration, the fluid cannot pass from one of the chambers to the other through the primary fluid path.

In tests on known gas pressure springs, an entrainment of the O-ring from its intended position by the bimetal spring is, in most cases, the cause of a non-opening of the known temperature-driven valve assemblies at low temperatures. In this way, the primary fluid path between the O-ring and the bimetal spring remains closed since the O-ring and the bimetal spring also abut on each other in the opening configuration of the bimetal spring.

The secondary fluid path provides for an alternative fluid-conducting connection of the two chambers to the primary fluid path. In this way, the valve assembly will also reliably open when the sealing means is in an operating position closing the primary fluid path.

In embodiments, the secondary fluid path opens only when the switching element is in the opening configuration and the sealing means has moved out of its mounting position together with the switching element. In this way, it is ensured that the valve assembly remains reliably closed in the closing configuration.

The sealing means may, for example, at least partly abut on the channel wall both in an axial direction along the axis of movement and in a radial direction radial to the axis of movement in the mounting position. In the operating position, for example, the sealing means does not abut on the channel wall, particularly on the sealing surface, in the axial direction.

In embodiments alternative to the present invention which ensure a more reliable opening of the valve assembly in the opening configuration a recess enabling a secondary fluid path could be omitted. To this end, the sealing means could, for example, be fixed to the channel wall. The fixation could, for example, be positive along the axis of movement, particularly by arranging the sealing means, at least partly, in a groove in the channel wall. The fixation could, for example, be material, particularly by adhesively bonding the sealing means to the channel wall. However, a positive fixation of the sealing means on the channel wall is expensive to produce. Adhesively bonding the sealing means likewise increases production expenditure and is, in long-term use, particularly in case of frequent and large temperature fluctuations as encountered in case of a gas pressure spring used in a vehicle, not sufficiently reliable.

The secondary fluid path does not necessarily come into play every time the switching element is in the opening configuration, but serves as redundancy to enhance the reliability of the valve assembly. Also, a plurality of, for example two, three, four, or five, recesses may be provided for providing a plurality of secondary fluid paths to further increase redundancy. A plurality of recesses will, in particular, ensure that the valve assembly opens reliably even when one of the recesses is blocked, for example by dirt particles.

In order to ensure uniform mechanical strain and a simple production of the channel wall, in embodiments a plurality of recesses is uniformly distributed around the axis of movement, i.e., in regular angular intervals.

In embodiments the at least one recess comprises or is a groove for a fluid transport along the axis of movement in an outer surface of the channel wall circumferentially extending around the axis of movement, the outer surface for example being cylindrical and/or coaxial to the axis of movement. In a particularly simple manner, the recess can be formed as a groove in the outer surface, particularly when a longitudinal axis of the groove extends substantially parallel to the axis of movement.

The groove may then be covered by the sealing means when the sealing means is in its mounting position, and it will only be unblocked for fluid passage when the sealing means moves out of its mounting position.

A width of the at least one recess in the circumferential direction around the axis of movement is for example smaller than an outer radius of the cylindrical outer surface of the channel wall. In this way, it is ensured that the recess is not so large that it has a negative impact on a positive fixation of the sealing means on the channel wall. In an embodiment, the radius of the outer surface of the channel wall is one to three times as large, for example 1.5 to two times as large, as a further example 1.7 to 1.8 times as large as the width of the recess.

In another embodiment, the recess has the form of a circular cylinder section. A circular cylinder-shaped recess can be produced relatively easily and with sufficiently low manufacturing tolerances even in case of compact components. At the same time, it does not present an excessively large flow resistance to the damping fluid.

In an embodiment, the sealing means is, transverse to the axis of movement, positively fixed relative to the channel wall, a thickness of the sealing means along the axis of movement in an unloaded state in an embodiment being larger than a distance along the axis of movement of the switching element, in the opening configuration, from the through opening.

A positive fixation transverse to the axis of movement which is substantially easier to produce than a positive fixation along the axis of movement prevents an uncontrolled movement of the sealing means in the valve assembly. In particular, a sufficiently large thickness of the sealing means prevents it from getting between the switching element and the through opening where the sealing means could block the function of the switching element.

The sealing means may, for example, comprise an O-ring which circumferentially extends around the channel portion extending along the axis of movement and is thereby positively fixed transverse to the axis of movement.

In an embodiment, the sealing means is, in the opening configuration of the switching element, movable relative to the channel wall along the axis of movement. Owing to the secondary fluid path provided for by the recess, no elaborate fixation of the sealing means against movements along the axis of movement is required.

In an embodiment, a thickness of the sealing means along the axis of movement is, in a unloaded state, smaller than a distance along the axis of movement of the switching element in the opening configuration from the sealing surface, and the thickness of the sealing means is larger than or equal to a distance along the axis of movement of the switching element in the closing configuration from the sealing surface. Owing to this design, the sealing means can, in a sealing manner, close a space between the sealing surface and the switching element in the closing configuration; and in the opening configuration, a first and/or second fluid path between the sealing means and the switching element and/or the sealing surface can remain free for the fluid-conducting connection of the two chambers.

In an embodiment, the switching element comprises or is a bimetal deforming along the axis of movement at a switching temperature between the opening temperature range and the closing temperature range. A bimetal, particularly disc-shaped one, for example a bimetal spring, is a particularly cost-effective, reliable and maintenance-free temperature-driven switching element. The bimetal spring may, in particular, be configured and/or arranged like the bimetal spring described in patent application DE 11 2006 000 335 T5 which will bring about the advantages described there. The corresponding paragraphs [0030] to [0041] are incorporated herein by reference.

In embodiments, the channel portion, the opening normal of the through opening, and/or the surface normal of the sealing surface are parallel to the axis of movement. Owing to a parallel orientation of one or more, for example, all of the above-mentioned components to the axis of movement, the valve assembly is particularly simple to produce. In addition, the sealing means can particularly reliably cooperate with the sealing surface in a sealing manner in case of a movement of the switching element along the axis of movement towards the sealing surface into the closing configuration.

The aspect according to embodiments of the invention is, in addition, solved by a gas pressure spring comprising at least two separated chambers for accommodating a fluid, the chambers being connected to each other via a valve assembly according to embodiments of the invention.

Owing to the valve assembly, a fluid-conducting connection between the two chambers can be reliably opened and closed in a temperature-driven manner, for example to increase or decrease a spring force of the gas pressure spring in a temperature-controlled way.

In an embodiment, the valve assembly is opened in an opening temperature range below a switching temperature so that the at least two chambers are in fluid connection, and the valve assembly is closed in a closing temperature range above the switching temperature so that the at least two chambers are separated from each other in a fluid-tight manner.

In this way, the two chambers may provide a jointly effective gas volume of the gas pressure spring below the switching temperature, while only one of the chambers provides for the effective gas volume of the gas pressure spring above the switching temperature. Accordingly, a temperature dependency of the spring force of the gas pressure spring which usually decreases with lowering temperatures can be, at least partly, reliably compensated by connecting the second chamber below the switching temperature.

BRIEF DESCRIPTION

Some of the embodiments will be described in detail, with references to the following Figures, wherein like designations denote like members, wherein.

DETAILED DESCRIPTION

Figure 1:
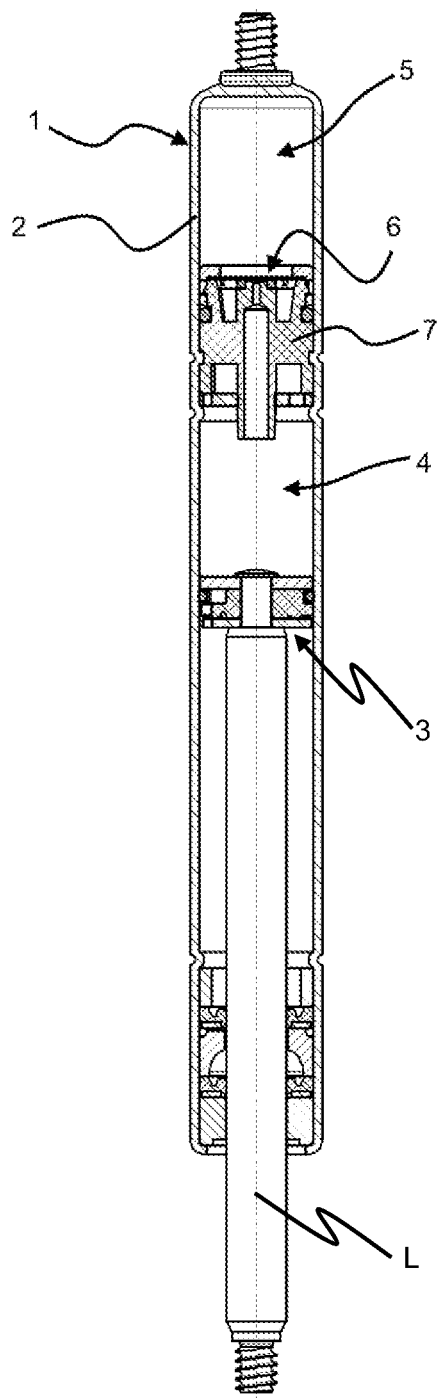
FIG. 1 shows a longitudinal cross-sectional view of an embodiment of a gas pressure spring according to embodiments of the invention.

FIG. 1 shows an embodiment of a gas pressure spring 1 according to embodiments of the invention in the longitudinal cross-section along a longitudinal axis L of the gas pressure spring. The gas pressure spring comprises a housing 2 and a piston 3 slidable in the housing 2 along the longitudinal axis L of the gas pressure spring 1. The gas pressure spring 1 further comprises two chambers 4, 5 as well as a temperature-driven valve assembly 6 including a valve body 7. Depending on the temperature of the temperature-driven valve assembly 6, it does or does not establish a fluid-conducting connection between a main chamber 4 and a secondary chamber 5.

In a closing temperature range, for example at temperatures above 4° C., the valve assembly is closed, and the gas pressure spring 1 operates using only the main chamber 4. The gas pressure spring 1 will then offer a force delivery based on the gas mass and the gas volume contained in the main chamber 4.

In an opening temperature range, for example below 4° C., the temperature-driven valve assembly 6 opens so that the gas pressure spring 1 uses both chambers 4, 5 and provides for a force delivery based on the overall gas volume of both chambers 4, 5. The connection of the main chamber 4 and the secondary chamber 5 will therefore provide for an increased force delivery in the opening temperature range.

In the result, the temperature dependency of the gas pressure spring force can be reduced in this way so that a sufficiently large force is provided for at low temperatures, and a non-excessive force is obtained at high temperatures.

Figure 2:
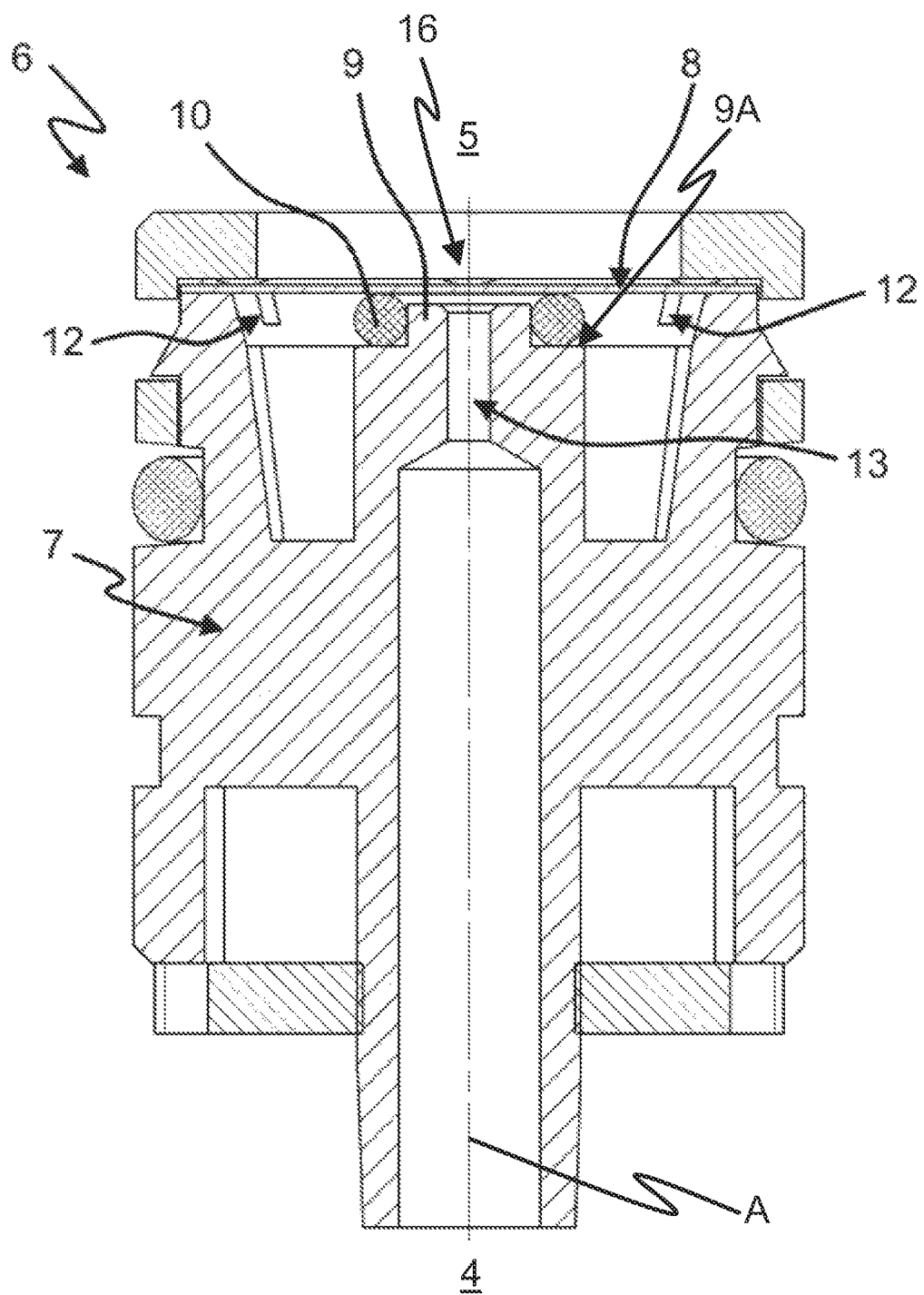
FIG. 2 shows a longitudinal cross-sectional view of a temperature-driven valve assembly according to conventional art in a closed valve position.
Figure 3:
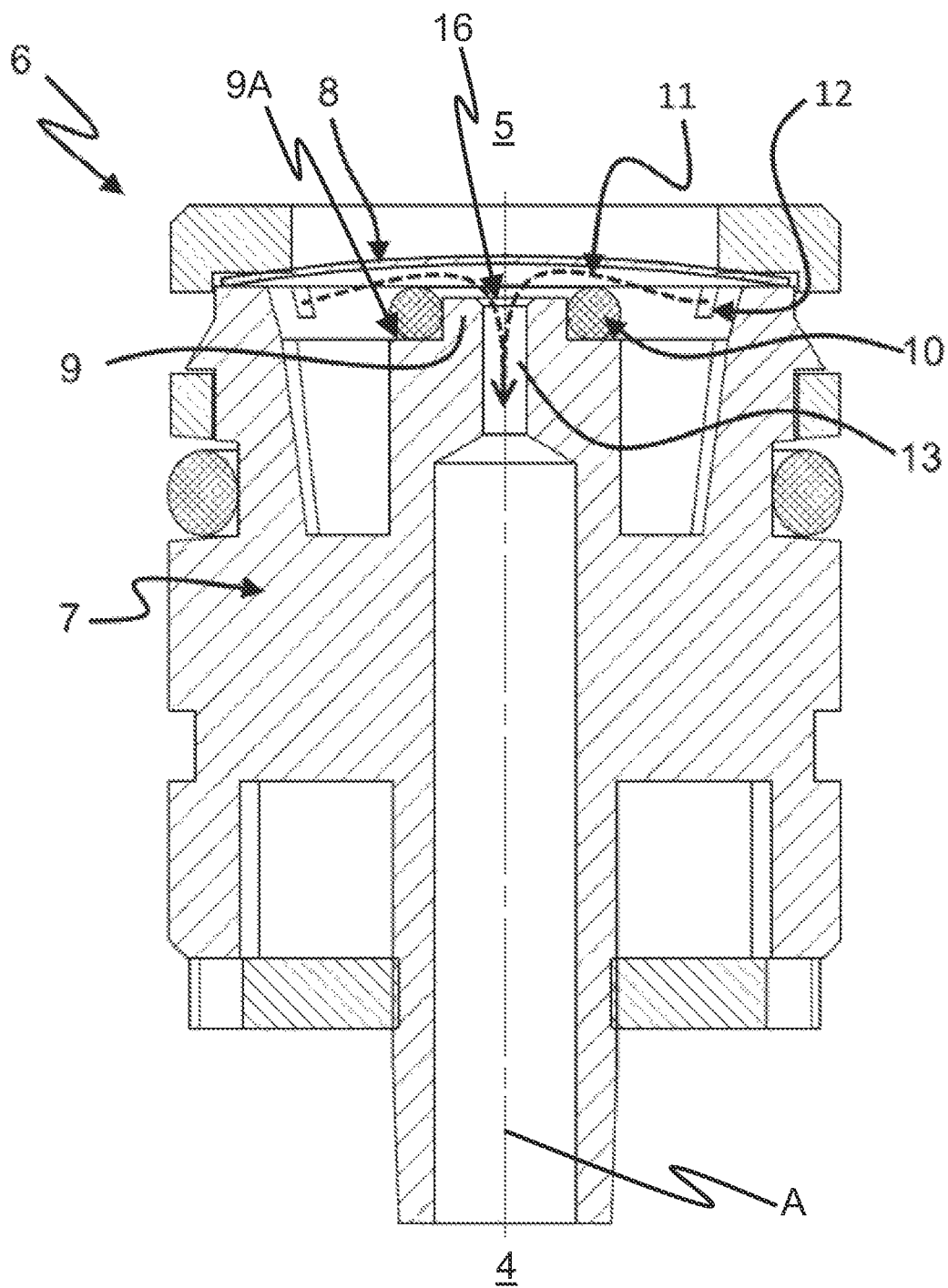
FIG. 3 shows a longitudinal cross-sectional view of the temperature-driven valve assembly of FIG. 2 according to conventional art in an opening configuration with the sealing means in its mounting position.
Figure 4:
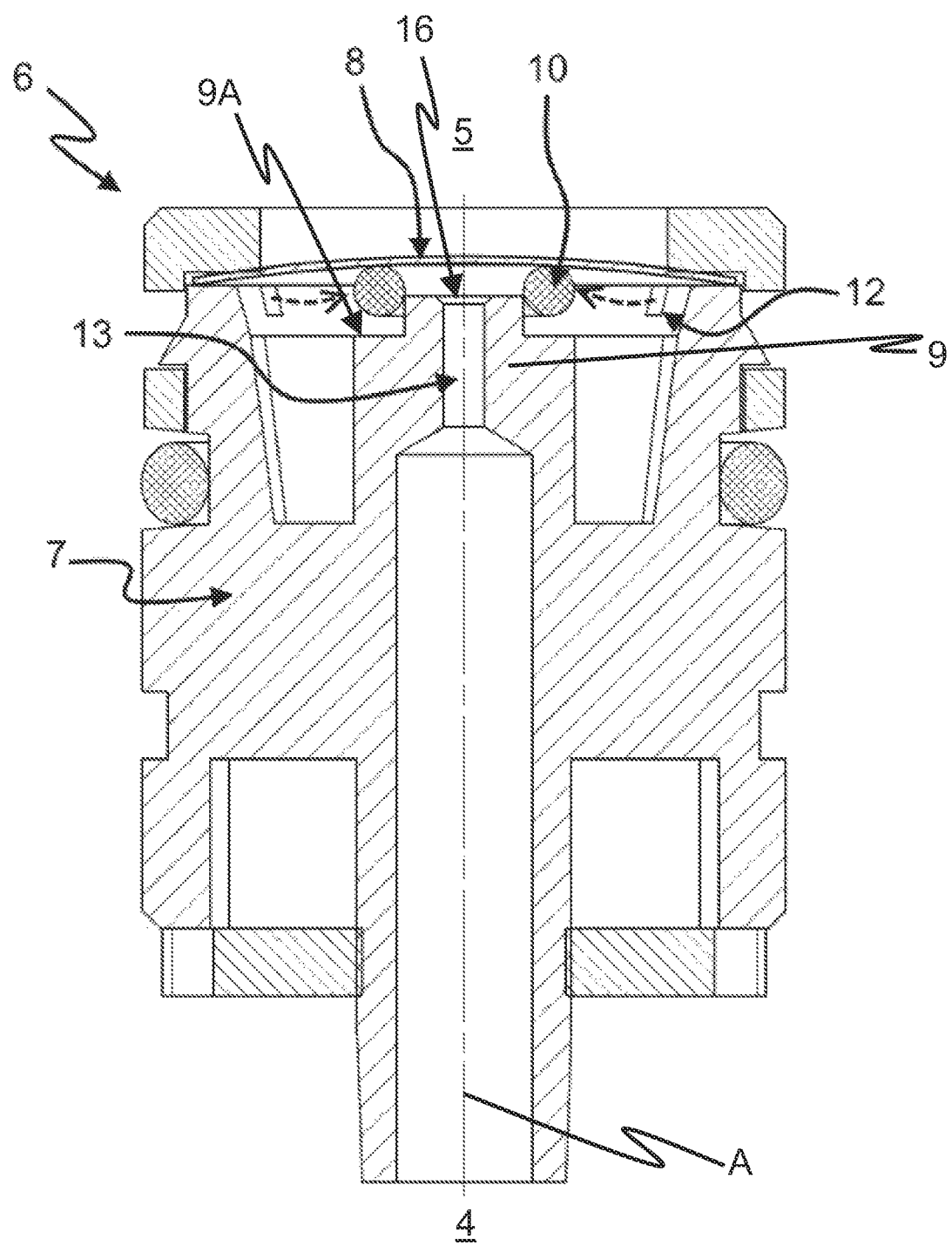
FIG. 4 shows a longitudinal cross-sectional view of the temperature-driven valve assembly of FIGS. 2 and 3 according to conventional art in a closing configuration with the sealing means in an operating position.

FIGS. 2 to 4 show a known temperature-driven valve assembly 6 according to conventional art in the longitudinal cross-section along an axis of movement A of the switching element 8 of the valve assembly 6, respectively. The valve assembly 6 comprises a switching element 8, for example a bimetal spring which is, at least in sections, movable along the axis of movement A in a temperature-driven manner in an opening configuration at an opening temperature and a closing configuration at a closing temperature.

In a state mounted in a gas pressure spring 1, the axis of movement A may, for example, coincide with the longitudinal axis L of the gas pressure spring 1, and the valve assembly 6 may, for example, be arranged between a main chamber 4, according to the Figure, for example, below the valve assembly 6, and a secondary chamber 5, according to the Figure, for example, above the valve assembly 6.

In the closing configuration illustrated in FIG. 2, the switching element 8 cooperates, in a sealing manner, with a sealing means 10 arranged around a through opening 16 of a channel portion 13 of the valve assembly 6, for example an O-ring, and a sealing surface 9A of a channel wall 9 of the channel portion which is, for example, orthogonal to the axis of movement A. Therefore, in the closing configuration, the sealing means forms a seal which closes the through opening 16 in a fluid-tight manner and, for example, disconnects the main chamber 4 from the secondary chamber 5 of a gas pressure spring 1.

FIG. 3 shows the temperature-driven valve assembly 6 of FIG. 2 with the switching element 8 in its opening configuration. For example, below a switching temperature (e.g., 4° C.), the switching element 8 moves, in sections, away from the sealing surface 9A along the axis of movement A, for example, a bimetal spring curves away from the sealing surface 9A, and thereby opens a primary fluid path 11 extending between the sealing means 10 remaining in its mounting position and the switching element 8.

The primary fluid path 11 leads, for example, through a number of inlets 12 into the valve assembly 6 and through the through opening 16 and the channel portion 13, for example on an, along the axis of movement A, opposite side of the valve assembly 6, out of the valve assembly 6 and connects, for example, the main chamber 4 to the secondary chamber 5 of a gas pressure spring 1.

FIG. 4, like FIG. 3, also shows the valve assembly 6 with the switching element 8 in its opening configuration in which, as compared to the closing configuration, the switching element 8 has, in sections, moved away from the sealing surface 9A along the axis of movement A. However, the sealing means 10 has moved out of its mounting position into an operating position spaced apart from the sealing surface 9A along the axis of movement A together with the switching element 8 and continues to abut on the switching element 8 in a sealing manner so that no fluid flow from the inlets 12 to the channel portion 13 is possible. In the result, the valve assembly 6 is closed for a fluid even though the switching element 8 is in its opening configuration.

Figure 5:
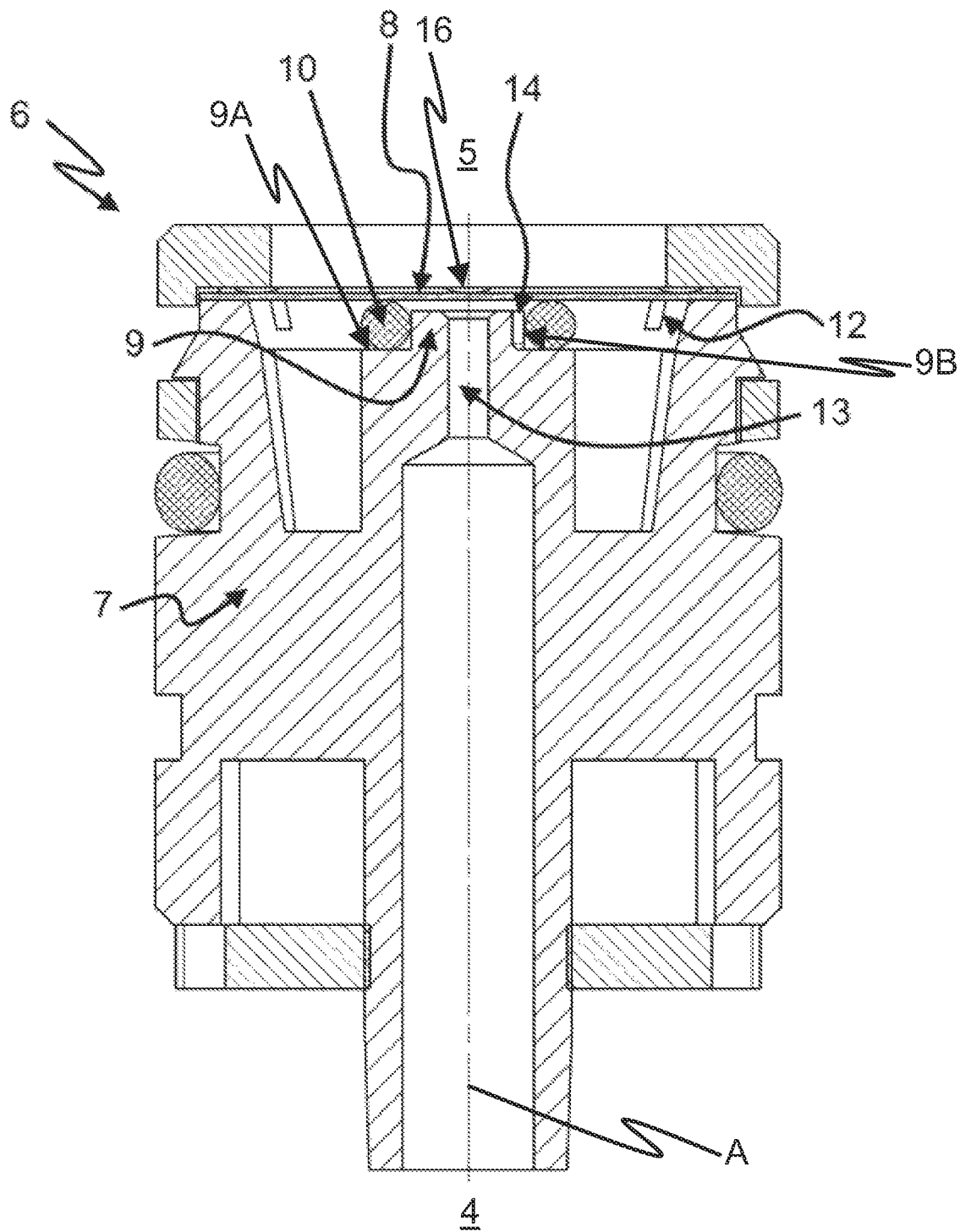
FIG. 5 shows a longitudinal cross-sectional view of an embodiment of a temperature-driven valve assembly according to embodiments of the invention in a closing configuration.
Figure 6:
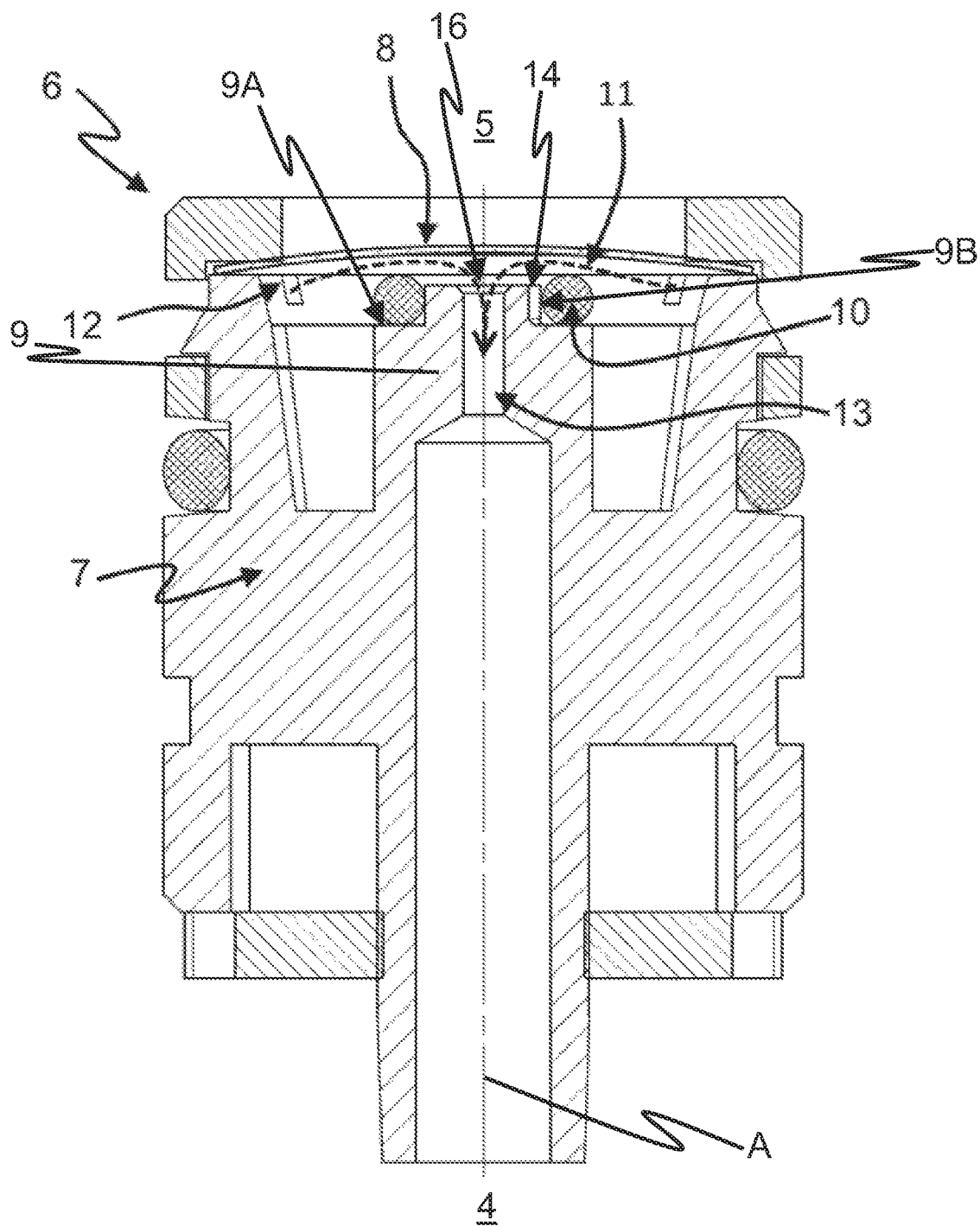
FIG. 6 shows a longitudinal cross-sectional view of the temperature-driven valve assembly of FIG. 5 according to embodiments of the invention in an opening configuration with the sealing means in its mounting position.
Figure 7:
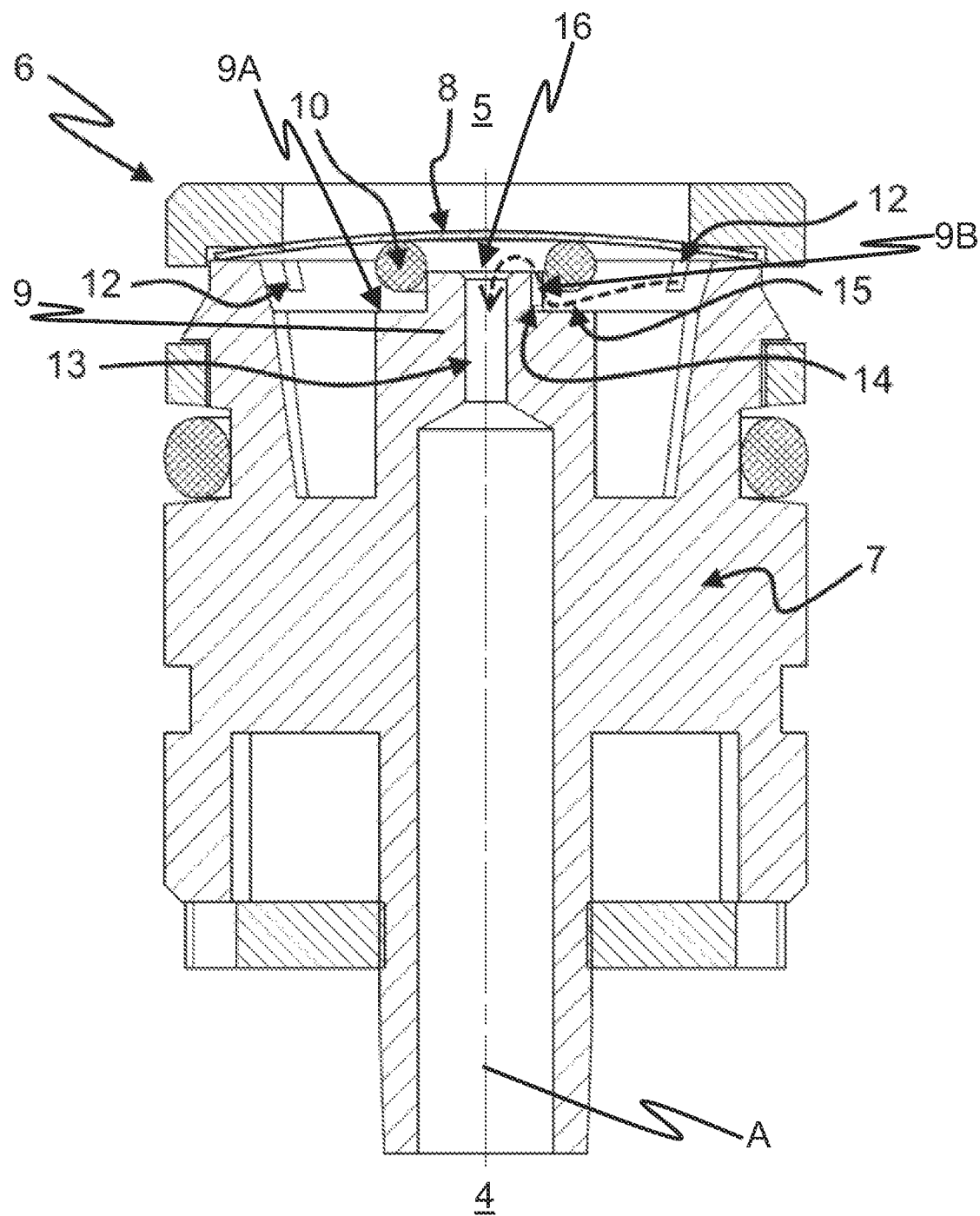
FIG. 7 shows a longitudinal cross-sectional view of the temperature-driven valve assembly of FIGS. 5 and 6 according to embodiments of the invention in an opening configuration with the sealing means in an operating position.

FIGS. 5 to 7 show an embodiment of a temperature-driven valve assembly 6 according to embodiments of the invention in the longitudinal cross-section along an axis of movement A of a switching element 8 of the valve assembly, respectively.

The valve assembly 6 comprises a switching element 8, for example a bimetal spring having an opening configuration at an opening temperature and a closing configuration at a closing temperature which is, at least in sections, movable along the axis of movement A in a temperature-driven manner.

In a state installed in a gas pressure spring 1, the axis of movement A may, for example, coincide with the longitudinal axis L of the gas pressure spring 1, and the valve assembly 6 may, for example, be arranged between a main chamber 4, in FIG. 5, for example, below the valve assembly 6, and a secondary chamber 5, in FIG. 5, for example, above the valve assembly 6.

In the closing configuration illustrated in FIG. 5, the switching element 8 cooperates, in a sealing manner, with a sealing means 10 arranged around a through opening 16 of a channel portion 13 of the valve assembly 6, for example an O-ring, and a sealing surface 9A of a channel wall 9 of the channel portion 13 which is, for example, orthogonal to the axis of movement A. In the closing configuration, the sealing means thus forms a seal closing the through opening 16 in a fluid-tight manner and, for example, separating the main chamber 4 from the secondary chamber 5 of a gas pressure spring 1.

In the channel wall 9, for example in an outer surface 9B of the channel wall 9 which is, in particular, cylindrical and coaxial to the axis of movement A, a recess 14, for example a groove for a fluid transport along the axis of movement A, is provided. The recess is, for example, radially fully located within the sealing means 10 in its mounting position with respect to the axis of movement A. The recess 14 therefore does not affect the tightness of the valve assembly 6 in the shown closing configuration.

FIG. 6 shows the temperature-driven valve assembly 6 of FIG. 5 with the switching element 8 in its opening configuration. For example, below a switching temperature (e.g., 4° C.), the switching element 8 moves away from the sealing surface 9A in sections along the axis of movement A, for example, a bimetal spring curves away from the sealing surface 9A, and thereby opens a primary fluid path 11 passing between the sealing means 10 remaining in its mounting position and the switching element 8.

The primary fluid path 11, for example, leads through a number of inlets 12 into the valve assembly 6 and through the through opening 16 and the channel portion 13, for example, on an, along the axis of movement A, opposite side of the valve assembly 6, out of the valve assembly 6, and connects, for example, the main chamber 4 to the secondary chamber 5 of a gas pressure spring 1.

The recess 14 has no substantial influence on the flow-through performance in this configuration of the valve assembly 6.

FIG. 7, like FIG. 6, also shows the valve assembly 6 with the switching element 8 in its opening configuration in which the switching element 8 has, as compared to the closing configuration, moved away from the sealing surface 9A in sections along the axis of movement A. However, the sealing means 10 has moved out of its mounting position along the axis of movement A into an operating position spaced apart from the sealing surface 9A together with the switching element 8 and continues to abut on the switching element 8 in a sealing manner so that, like in the analogous configuration of a valve assembly 6 according to conventional art shown in FIG. 4, no fluid flow is possible through the primary fluid path 11 passing between the switching element 8 and the sealing means 10.

Other than according to conventional art, however, a secondary fluid path 15 through the recess 14 is opened in the configuration of the valve assembly 6 according to embodiments of the invention illustrated FIG. 7. The secondary fluid path 15 leads, for example, through a number of inlets 12 into the valve assembly 6 and through the through opening 16 and the channel portion 13, for example, on an, along the axis of movement A, opposite side of the valve assembly 6, out of the valve assembly 6 and connects, for example, the main chamber 4 to the secondary chamber 5 of a gas pressure spring 1 like the primary fluid path 11.

In embodiments the secondary fluid path 15 opens only when the switching element 8 is in an opening configuration and the sealing means 10 has moved out of its mounting position along the axis of movement A into an operating position together with the switching element 8, particularly so that the primary fluid path 11 remains closed.

Figure 8:
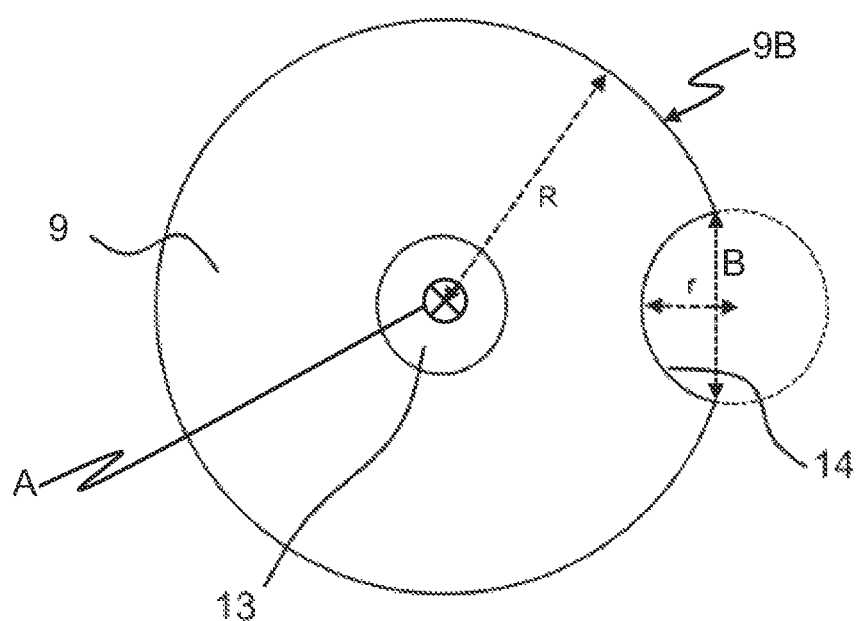
FIG. 8 shows a cross-sectional view of the channel portion of an embodiment of a temperature-driven valve assembly according to embodiments of the invention.

FIG. 8 shows a cross-section of a channel wall 9 of an embodiment of a temperature-driven valve assembly 6 according to embodiments of the invention. The recess 14 of the valve assembly 6 is, for example, a groove for a fluid transport along the axis of movement A of the switching element 8 of the valve assembly 6, the recess 14 being located in a, for example, cylindrical outer surface 9B of the channel wall 9 coaxial to the axis of movement.

The recess 14 has a width B in circumferential direction about the axis of movement A and, for example, the shape of a circular cylinder section having a curvature radius r. The outer radius R of the outer surface 9B is larger than the width B of the recess 14, for example 1.5 times to two times as large as the width B. In this way, it is ensured that the recess 14 does not affect the fixation of a sealing means (not illustrated) of the valve assembly 6 circumferentially extending around the outer surface 9B.

Although the invention has been illustrated and described in greater detail with reference to the preferred exemplary embodiments, the invention is not limited to the examples disclosed, and further variations can be inferred by a person skilled in the art, without departing from the scope of protection of the invention.

For the sake of clarity, it is to be understood that the use of "a" or "an" throughout this application does not exclude a plurality, and "comprising" does not exclude other steps or elements.

LIST OF REFERENCE NUMERALS

1 Gas pressure spring
2 Housing
3 Piston
4 Main chamber
5 Secondary chamber
6 Valve assembly
7 Valve body
8 Switching element
9 Channel wall
9A Sealing surface
9B Outer surface
10 Sealing means
11 Primary fluid path
12 Inlet
13 Channel portion
14 Recess
15 Secondary fluid path
16 Through opening
A Axis of movement
B Width
L Longitudinal axis
r Curvature radius
R Outer radius

The invention claimed is:

1. A gas pressure spring comprising two separated chambers for accommodating a fluid, wherein the chambers are connected to each other through a valve assembly, the valve assembly comprising:
   a) a channel portion for the fluid-conducting connection of the two chambers for accommodating the fluid having a through opening for the fluid;
   b) at least one switching element having an opening configuration in an opening temperature range and a closing configuration in a closing temperature range;
   b1) wherein the at least one switching element is, at least in sections, movable relative to the channel portion along an axis of movement in a temperature-driven manner;
   b2) wherein an opening normal of the through opening is oriented towards the switching element, and
   b3) wherein the channel portion circumferentially enclosed by a channel wall around the axis of movement; and
   c) at least one sealing means circumferentially extending around the channel wall;
   c1) wherein the at least one sealing means, in a mounting position, abuts on at least one sealing surface of the channel wall, a surface normal of the sealing surface being oriented towards the at least one switching element;

c2) wherein the at least one sealing means, in the mounting position, cooperates, in a sealing manner, with the at least one sealing surface and the at least one switching element (8) in the closing configuration and closes the through opening; and c3) wherein the at least one sealing means, in the mounting position, is spaced apart from the at least one switching element in the opening configuration along the axis of movement so that a primary fluid path connects the two chambers through the through opening and between the at least one switching element and the at least one sealing means in a fluid-conducting manner, d) at least one recess in the channel wall, d1) wherein a projection of the at least one recess along the axis of movement is, enclosed by a projection of the at least one sealing surface along the axis of movement, and d2) wherein, in an operating position of the sealing means in which the at least one sealing means is spaced apart from the at least one sealing surface along the axis of movement, a secondary fluid path connects the two chambers to each other in a fluid-conducting manner through the at least one recess.

2. The gas pressure spring according to claim 1, wherein the at least one recess comprises a groove for a fluid transport along the axis of movement in an outer surface of the channel wall circumferentially extending around the axis of movement, the outer surface being cylindrical and/or coaxial to the axis of movement.

3. The gas pressure spring according to claim 2, wherein a width of the at least one recess in the circumferential direction around the axis of movement is smaller than an outer radius of the cylindrical outer surface of the channel wall.

4. The gas pressure spring according to claim 1, wherein the sealing means is positively fixed transverse to the axis of movement relative to the channel wall, a thickness of the sealing means the axis of movement in an unloaded state being larger than a distance along the axis of movement of the at least one switching element in the opening configuration from the through opening.

5. The gas pressure spring according to claim 1, wherein the at least one sealing means is movable relative to the channel wall along the axis of movement in the opening configuration of the at least one switching element.

6. The gas pressure spring according to claim 1, wherein a) a thickness of the at least one sealing means along the axis of movement in an unloaded state is smaller than a distance along the axis of movement of the at least one switching element the opening configuration from the at least one sealing surface; and b) the thickness of the at least one sealing means is larger than or equal to a distance along the axis of movement of the at least one switching element the closing configuration from the at least one sealing surface.

7. The gas pressure according to claim 1, wherein the at least one switching element comprises a bimetal deforming along the axis of movement at a switching temperature between the opening temperature range and the closing temperature range.

8. The gas pressure spring according to claim 1, wherein the channel portion the opening normal of the through opening, and/or the surface normal of the at least one sealing surface are parallel to the axis of movement.

9. The gas pressure spring according to claim 1, wherein a) the valve assembly is opened in an opening temperature range below a switching temperature so that the two chambers are in fluid connection; and b) the valve assembly is closed in a closing temperature range above the switching temperature so that the two chambers are separated from each other in a fluid-tight manner.

* * * * *